UNITED STATES PATENT OFFICE.

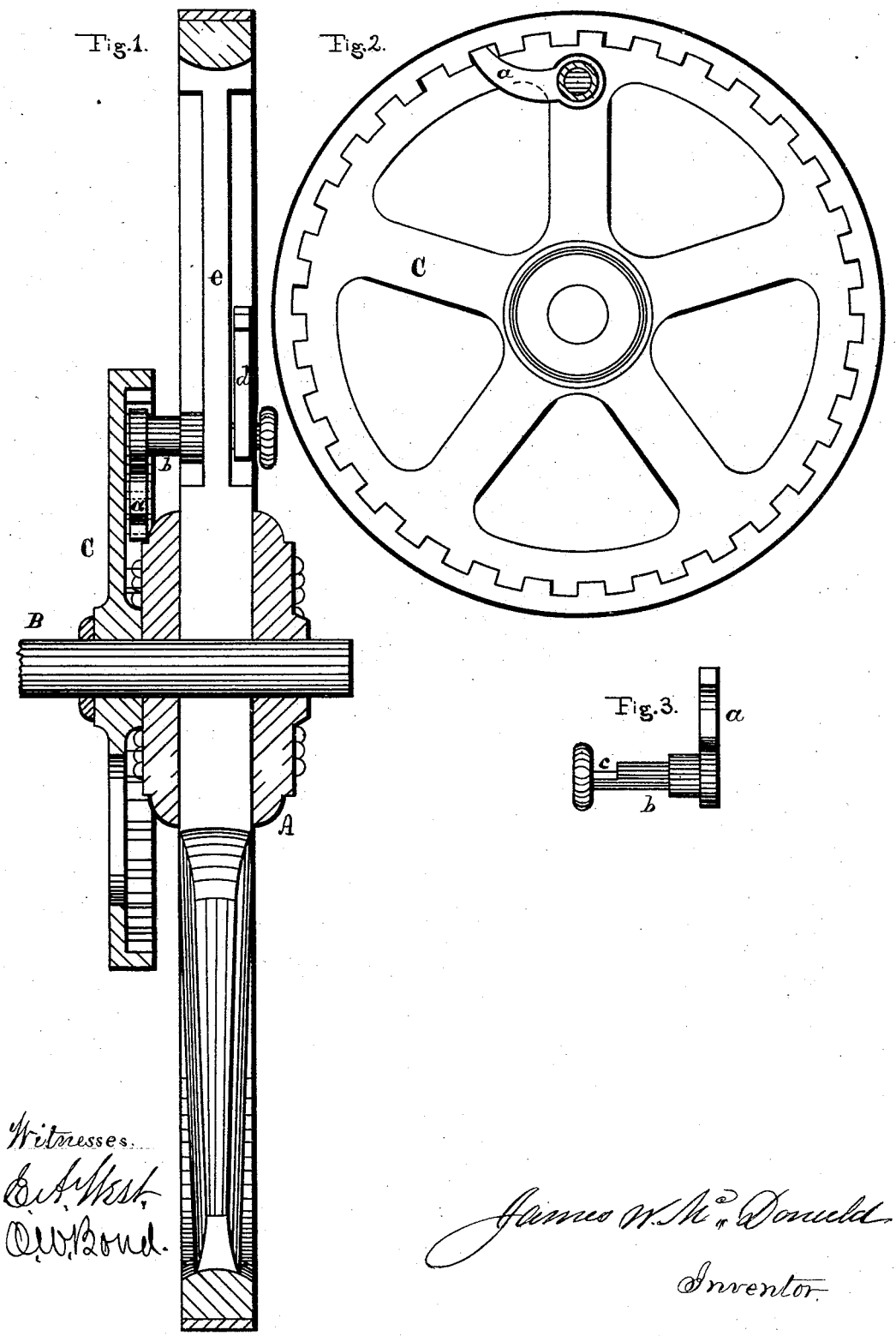

JAMES W. McDONALD, OF CHICAGO, ILLINOIS.

IMPROVEMENT IN STREET-SWEEPING MACHINES.

Specification forming part of Letters Patent No. 157,338, dated December 1, 1874; application filed September 26, 1874.

*To all whom it may concern:*

Be it known that I, JAMES W. McDONALD, of Chicago, Cook county, Illinois, have invented a new and useful Improvement in Street-Sweeping Machines, of which the following is a full description, reference being had to the accompanying drawings, in which—

Figure 1 is a vertical section; Fig. 2, a plan view of the ratchet-wheel; Fig. 3, a detail.

This improvement is primarily designed to be applied to a so-called side sweeper. It consists in an improved device for throwing the machine in and out of gear, which I accomplish, by means of a single inside ratchet-wheel, permanently secured to the axle, and connected with the driving-wheel by means of a pawl.

I have represented in the drawings only these parts, the other parts of the machine being in use.

In the drawings, A represents one of the main wheels which supports the machine, and by which it is also operated. B is a round axle, which revolves in bearings suitably connected with the frame of the machine. C is a ratchet-wheel, which is permanently keyed or otherwise secured to the axle B. *a* is a pawl upon an operating stem, *b*, which stem passes through one of the spokes of the wheel A. It will be well to make this particular spoke of iron. The main part of the stem *b* is round, but it has a flat spot, *c*. *d* is a flat spring; one end is secured to the spoke *e*, the other end rests upon the stem *b*.

The brooms are driven, when the machine is in motion, by means of miter gear-wheels, suitably connected with the axle, as usual.

In use, when the pawl *a* is not engaged with the ratchet, the wheels A will revolve upon the axle, and the machine can be moved from place to place without operating the brooms, but when the pawl is engaged with the ratchet the wheel A will be connected with the ratchet-wheel C, which is permanently secured to the axle B, and hence, when the machine is in motion, the ratchet-wheel C, the axle B, and the wheel A, will all revolve together, and the brooms will be operated through the gear-wheels secured to the axle, as before specified.

This device for throwing the machine into and out of gear is much superior to a clutch, which soon wears and becomes unfit for use.

It is easily operated, and when the machine is moved backward the pawl will be automatically disengaged, and the motion of the brooms will cease, but when the forward movement is again commenced, the pawl will engage itself with the ratchet, and the brooms will be operated.

The spring *d* rests upon the flat part *c* of the stem *b*, and holds the pawl in place while the machine is moving forward. The operator can disengage the pawl by means of the stem *b*, (having first stopped the machine and given it a slight backward movement,) and when it has been turned back or up, it will be held there by the spring until released by the operator.

A ratchet-wheel, with its pawl, may be placed on each side of the machine, or only on one side, as may be necessary.

What I claim as new is as follows:

The ratchet-wheel C and pawl *a*, in combination with the axle B and wheel A of a street-sweeping machine, all constructed and operating substantially as and for the purpose specified.

JAMES W. McDONALD.

Witnesses:
  E. A. WEST,
  O. W. BOND.